United States Patent [19]

Parker

[11] Patent Number: 5,082,921

[45] Date of Patent: Jan. 21, 1992

[54] BENZOTRIFLUORIDE ARYL ETHER POLYMER

[75] Inventor: Theodore L. Parker, Walnut Creek, Calif.

[73] Assignee: The Dow Chemical Company, Midland, Mich.

[21] Appl. No.: 573,607

[22] Filed: Aug. 27, 1990

[51] Int. Cl.$^5$ .............................................. C08G 65/40
[52] U.S. Cl. .................................. 528/219; 528/125; 528/128; 528/171
[58] Field of Search ........................ 528/219, 125, 171

[56] References Cited

U.S. PATENT DOCUMENTS

| | | |
|---|---|---|
| 3,622,541 | 11/1971 | Darsow et al. |
| 3,634,354 | 1/1972 | Darsow et al. |
| 4,562,243 | 12/1985 | Percec . |
| 4,634,742 | 1/1987 | Percec . |
| 4,701,514 | 10/1987 | Percec . |
| 4,749,756 | 6/1988 | Percec . |
| 4,806,601 | 2/1989 | Percec . |
| 4,827,054 | 5/1989 | Lau et al. |

FOREIGN PATENT DOCUMENTS 62-70452 3/1987 Japan .

OTHER PUBLICATIONS

Kellman et al., "Fluorinated Polyarylether-Sulfones Via Phase Transfer Catalyzed Nucleophilic Aromatic Substitution", *Polym. Prepr., Am. Chem. Soc., Div. Polym. Chem.*, 1980, 21(2), 164-5 (Chemical Abstract only).

Kellman et al., "Aromatic Substitution in Condensation Polymerization Catalyzed by Solid-Liquid Phase Transfer", *ACS Symp. Ser.*, 1987, 326 (Chemical Abstract only).

Shimizu et al., "Synthesis and Characterization of Fluorine-Containing Aromatic Polyethers from Tetrafluoroisophthalonitrile and Bisphenols", *J. Polym. Sci., Part A, Polym. Chem.*, 1987, 25(9), 2385-93 (Chemical Abstract only).

Tullos et al., "Polymers Derived from Hexafluoroacetone: 12F poly(ether ketone)", *Polym. Mater. Sci. Eng.*, 1989, 60, 310-15 (Chemical Abstract only).

*Primary Examiner*—Harold D. Anderson
*Attorney, Agent, or Firm*—Janet Pauline Clark

[57] ABSTRACT

This invention relates to novel benzotrifluoride aryl ether polymers useful as high performance engineering thermoplastics and as semi-permeable gas separation membranes.

16 Claims, No Drawings

BENZOTRIFLUORIDE ARYL ETHER POLYMER

BACKGROUND OF THE INVENTION

This invention relates to novel benzotrifluoride aryl ether polymers.

A number of polymers have been developed for use as high performance engineering thermoplastics, including polyarylethersulfone, polybenzoxazole, and polyetheretherketone. High performance engineering thermoplastics generally possess excellent thermal and oxidative stability, as well as good mechanical properties. Such thermoplastics are extensively used in place of metals and glass in many applications throughout the industry, particularly in automotive, aerospace, electronic, and packaging applications. Such thermoplastics possess utility in a wide variety of applications as fibers, films, molded articles, foams, coatings, and the like.

The problem associated with many of the high performance engineering thermoplastics developed to date is that they are difficult and/or expensive to synthesize and fabricate. What is needed are high performance engineering thermoplastics which are readily synthesized and fabricated. Such thermoplastics should possess good thermal and mechanical properties.

SUMMARY OF THE INVENTION

The invention is a novel benzotrifluoride aryl ether polymer which comprises a polymer with a backbone structure corresponding to the formula:

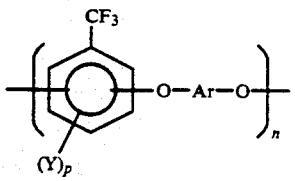

wherein

Ar is a divalent aromatic residue selected from the group consisting of:

A. an unsubstituted or inertly substituted phenylene, unsubstituted or inertly substituted naphthylene:

B.

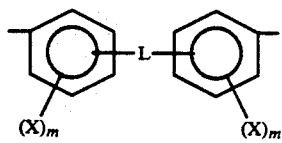

wherein

L is a direct bond, a divalent $C_{1-15}$ hydrocarbyl radical, a divalent $C_{1-8}$ halohydrocarbyl radical, —O—, —CO—, —S—, —SO—, —SO$_2$—, or —SS—, X is individually in each occurrence a hydrogen radical, a monovalent $C_{1-4}$ hydrocarbyl radical, a $C_{1-4}$ halohydrocarbyl radical, or a halogen, and m is a positive integer between 1 and 4 inclusive: and C. a divalent bisphenyl fluorenyl or spiro indanyl radical: and Y is individually in each occurrence a hydrogen radical, a monovalent $C_{1-4}$ hydrocarbyl radical, or a halogen, and p is a positive integer between 1 and 3 inclusive: an n is a positive real number of about 5 or greater.

The polymers of this invention possess excellent thermal stability, adequate mechanical strength, good temperature resistance, and are readily fabricated.

DETAILED DESCRIPTION OF THE INVENTION

The benzotrifluoride aryl ether polymers of this invention possess a polymer backbone structure which includes benzotrifluoride and aromatic residues connected by aryl ether linkages. The benzotrifluoride aryl ether polymers preferably possess a polymer backbone structure corresponding to the formula:

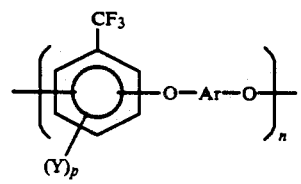

wherein

Ar is a divalent aromatic residue selected from the group consisting of:

A. an unsubstituted or inertly substituted phenylene, unsubstituted or inertly substituted naphthylene:

B.

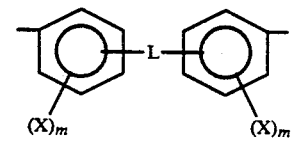

wherein

L is a direct bond, a divalent $C_{1-15}$ hydrocarbyl radical, a divalent $C_{1-8}$ halohydrocarbyl radical, —O—, —CO—, —S—, —SO—, —SO$_2$—, or —SS—, X is individually in each occurrence a hydrogen radical, a monovalent $C_{1-4}$ hydrocarbyl radical, a monovalent $C_{1-4}$ halohydrocarbyl radical, or a halogen, and m is a positive integer between 1 and 4 inclusive; and C. a divalent bisphenyl fluorenyl or spiro indanyl radical: and Y is individually in each occurrence a hydrogen radical, a monovalent $C_{1-4}$ hydrocarbyl radical, or a halogen, and p is a positive integer between 1 and 3 inclusive: and n is a positive real number of about 5 or greater.

In the embodiment wherein Ar comprises an inertly substituted phenylene or naphthylene, the phenolic rings are partially or fully substituted with inert substituents, that is, substituents which do not substantially interfere with the use of the polymer in the intended application. In many applications, this means that the inertly substituted sites on the phenolic rings are substantially chemically unreactive. Preferred inert substituents include monovalent $C_{1-8}$ hydrocarbyl radicals, monovalent $C_{1-8}$ hydrocarbyloxy radicals, and halogens. More preferred inert substituents include monovalent $C_{1-4}$ hydrocarbyl radicals, monovalent $C_{1-4}$ hydrocarbyloxy radicals, and halogens. Preferred halogens are fluorine, chlorine, bromine, and iodine: more preferred halogens are fluorine, chlorine, and bromine; even more preferred halogens are fluorine and chlorine: the most preferred halogen is fluorine.

In the embodiment wherein Ar comprises

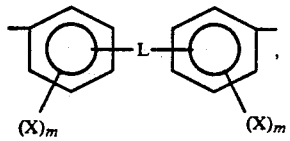

L is preferably a direct bond, a divalent $C_{1-8}$ hydrocarbyl radical, a divalent $C_{1-4}$ halohydrocarbyl radical, —O—, —CO—, —S—, —SO—, —SO$_2$—, or —SS—; L is more preferably a direct bond, a divalent $C_{1-4}$ hydrocarbyl radical, a divalent $C_{1-4}$ halohydrocarbyl radical, —O—, —CO—, —S—, 13 SO—, —SO$_2$—, or —SS—; L is even more preferably a direct bond, a divalent $C_{1-3}$ hydrocarbyl radical, or a divalent $C_{1-3}$ fluorohydrocarbyl radical; L is most preferably a direct bond or an unsubstituted or fluoro-substituted methylene or isopropylidene radical.

X is preferably a hydrogen radical, a monovalent $C_{1-3}$ hydrocarbyl radical, a monovalent $C_{1-3}$ halohydrocarbyl radical, or a halogen. For X, preferred halohydrocarbyl radicals include fluorohydrocarbyl radicals and preferred halogens include fluorine.

Y is preferably a hydrogen radical, a monovalent $C_{1-3}$ hydrocarbyl radical, a monovalent $C_{1-3}$ halohydrocarbyl radical, or a halogen. For Y, preferred halohydrocarbyl radicals include fluorocarbyl radicals and preferred halogens include fluorine.

n is preferably a positive real number between about 5 and about 1,000 inclusive, more preferably a positive real number between about 10 and about 250 inclusive.

The benzotrifluoride aryl ether polymers useful in this invention may be prepared by condensation of a benzotrifluoride compound containing two displaceable groups, such as fluoride or chloride, with a bisphenolic compound under anhydrous basic conditions in an aprotic media. The preparation of such benzotrifluoride compounds is known in the art. See U.S. Pat. No. 4,937,396, the relevant portions incorporated herein by reference for all legal purposes which may be served thereby. For example, the benzotrifluoride compound may be reacted with the bisphenolic compound in an aprotic solvent, such as N-methyl-2-pyrrolidinone or N,N-dimethylacetamide, under nitrogen in the presence of a molar equivalent potassium carbonate. The reaction mixture is typically heated to a temperature of about 40° C. to about 200° C. for a period of time sufficient to substantially form the polymer. The reaction mixture may then be neutralized and filtered and the polymer precipitated by contacting the filtrate with a mixture of an alcohol, such as methanol, and water.

The polymers so formed possess a number-average molecular weight (Mn) such that the polymers are useful for forming fibers, films, molded articles, foams, coatings, and the like. The number-average molecular weight of such polymers is preferably at least about 4,000, more preferably at least about 6,000: the number-average molecular weight of such polymers is preferably less than about 100,000, more preferably less than about 50,000. The intrinsic viscosity of such polymers is preferably between about 0.1 and about 2.0 deciliters/gram, more preferably between about 0.2 and about 1.0 deciliters/gram as measured in a dipolar aprotic solvent such as N-methyl-2-pyrrolidinone or dimethylacetamide. The polymers of this invention are preferably soluble in common dipolar aprotic solvents such as N-methyl-2-pyrrolidinone, dimethylacetamide, dimethylformamide, dimethylsulfoxide, sulfolane, and chlorinated hydrocarbons.

The polymers of this invention preferably possess glass transition temperatures of at least about 100° C., more preferably of at least about 150° C. The polymers preferably possess a tensile strength as measured by ASTM D-1708 of at least about 4,000 psi, more preferably of at least about 5,000 psi. The polymers preferably possess a tensile modulus as measured by ASTM D-1708 of at least about 200,000 psi, more preferably of at least about 250,000 psi. The polymers preferably possess an elongation at break as measured by ASTM D-1708 of at least about 2 percent, more preferably of at least about 3 percent. The polymers preferably exhibit a weight loss at about 400° C. as measured by thermogravimetric analysis (TGA) of less than about 20 percent, more preferably of less than about 10 percent.

The polymers of this invention are useful in forming fibers, films, molded articles, foams, coatings, and the like. In particular, the polymers of this invention possess utility as high performance engineering thermoplastics and as semi-permeable gas separation membranes.

SPECIFIC EMBODIMENTS

The following Examples are included to illustrate the invention and are not intended to limit the scope of the invention or claims.

EXAMPLE 1

Preparation Of Polymer From Heptafluorotoluene And Bisphenol A

A benzotrifluoride aryl ether polymer was prepared from heptafluorotoluene and bisphenol A using the following procedure. A round bottomed flask equipped with a mechanical stirrer, Dean-Stark apparatus, condenser, controller probe, and gas inlet and outlet was charged with about 80 milliliters of N-methyl-2-pyrrolidinone, about 65 milliliters of toluene, about 7.83 grams para-bisphenol A (2,2-bis(4-hydroxyphenyl)propane) and about 9.94 grams ground potassium carbonate. The flask was slowly purged with nitrogen during the polymerization. The reaction mixture was heated and the water removed azeotropically at about 145° C. to about 150° C. over a period of about ¾ hour. The toluene was then distilled out at about 190° C. and removed from the flask. The reaction mixture was then cooled to about 75° C. before adding about 7.48 grams of heptafluorotoluene. The reaction mixture temperature was gradually increased to about 160° C. and the reaction mixture heated for about 4 and ½ hours. The hot reaction mixture was neutralized with acetic acid and filtered through a preheated glass frit. The polymer was precipitated by pouring the filtrate into a mixture of about 70 volume percent methanol and 30 volume percent water. The precipitate was collected by filtration, washed with methanol, and dried under vacuum, yielding about 12.2 grams of polymer.

The glass transition of the polymer was determined to be about 162° C. as measured by Differential Scanning Calorimetry (DSC), using a duPont 1090 apparatus scanning at a rate of about 10° C./minute. The polymer exhibited a tensile strength of about 8140 psi, a tensile modulus of about 346 kpsi, and an elongation at break of about 3.9 percent as measured by ASTM D-1708. Thermogravimetric analysis (TGA), using a duPont 1090 apparatus scanning under air at a rate of about 10° C./minute, determined the 10 percent loss temperature to be about 468° C. The polymer structure was verified by 19F nmr using a GE-300 instrument, with CFCl₃ as the standard and CDCl₃ as the solvent.

EXAMPLE 2

Preparation Of Polymer From Heptafluorotoluene And Bisphenol AF₆

A benzotrifluoride aryl ether polymer was prepared from heptafluorotoluene and bisphenol AF6 (2,2-bis(4-hydroxyphenyl)-1,1,1,3,3,3-hexafluoropropane) using the following procedure. A round bottomed flask equipped with a mechanical stirrer, Dean-Stark apparatus, condenser, controller probe, and gas inlet and outlet was charged with about 100 milliliters of N,N-dimethylacetamide, about 5.16 grams of a,a,a,2,3,5,6-heptafluorotoluene, about 7.95 grams of bisphenol AF₆, and about 13.06 grams of ground potassium carbonate. The flask was slowly purged with nitrogen during the polymerization. The reaction mixture was stirred at ambient temperature for about 5 and ½ hours, heated at about 80° C. for about 42 hours, and heated at about 100° C for about 21 hours. About 0.08 grams additional bisphenol AF₆ was added to the reaction mixture and heating continued at about 100° C. for about 4 hours before adding N,N-dimethylacetamide and acetic acid to neutralize the polymer. The reaction mixture was filtered through a preheated glass frit, and the polymer was precipitated by pouring the filtrate into a mixture of about 70 volume percent methanol and about 30 volume percent water. The precipitate was collected by filtration, washed with methanol, and dried under vacuum.

The glass transition of the polymer was determined to be about 186° C. as measured by Differential Scanning Calorimetry (DSC), using a duPont 1090 apparatus scanning at a rate of about 10° C./minute. The polymer exhibited a tensile strength of about 6450 psi, a tensile modulus of about 349 kpsi, and an elongation at break of about 3.8 percent as measured by ASTM D-1708. Thermogravimetric analysis (TGA), using a duPont 1090 apparatus scanning under air at a rate of about 10° C./minute, determined the 10 percent loss temperature to be about 519° C. The polymer structure was verified by 19F nmr using a GE-300 instrument, with CFCl₃ as the standard and CDCl₃ as the solvent.

EXAMPLE 3

Preparation Of Polymer From 2,4-Dichlorobenzotrifluoride And Bisphenol A

A benzotrifluoride aryl ether polymer was prepared from 2,4-dichlorobenzotrifluoride and bisphenol A using the following procedure. A round bottomed flask equipped with a mechanical stirrer, Dean-Stark apparatus, condenser, controller probe, and gas inlet and outlet was charged with about 80 milliliters of N-methyl-2-pyrrolidinone, about 40 milliliters of toluene, about 8.64 grams of para-bisphenol A (2,2-bis(4-hydroxyphenyl)-propane) and about 10.96 grams of ground potassium carbonate. The Dean-Stark apparatus was charged with about 25 milliliters of toluene. The flask was slowly purged with nitrogen during the polymerization. The reaction mixture was heated and the water removed azeotropically at about 145° C. to about 150° C. over a period of about ½ hour. The temperature was then increased to about 160° C. and the toluene was distilled out and removed from the flask. The reaction mixture was then cooled to about 75° C. before adding about 8.02 grams of purified 2,4-dichlorobenzotrifluoride. The reaction mixture temperature was gradually increased to about 140° C. for about 75 minutes, then to about 165° C. for about 90 minutes, then to about 180° C. for about 18 hours. The hot reaction mixture was cooled to about 150° C., neutralized with acetic acid, and filtered through a preheated glass frit. The filtrate was dried under vacuum, yielding about 10.7 grams of polymer.

The glass transition of the polymer was determined to be about 82° C. as measured by Differential Scanning Calorimetry (DSC), using a duPont 1090 apparatus scanning at a rate of about 10° C./minute.

What is claimed is:

1. A benzotrifluoride aryl ether polymer which comprises a polymer with a backbone structure corresponding to the formula:

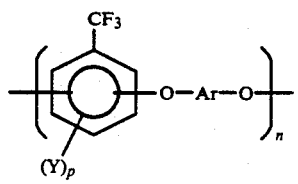

wherein

Ar is a divalent aromatic residue selected from the group consisting of:

A. an unsubstituted or inertly substituted phenylene, unsubstituted or inertly substituted naphthylene;

B.

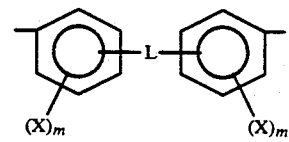

wherein

L is a direct bond, or L is a divalent $C_{1-15}$ hydrocarbyl radical, a divalent $C_{1-8}$ halohydrocarbyl radical, —O—, —CO—, —S—, —SO—, —SO₂—, or —SS—, X is individually in each occurrence a hydrogen radical, a monovalent $C_{1-4}$ hydrocarbyl radical, a monovalent $C_{1-4}$ halohydrocarbyl radical, or a halogen, and m is a positive integer between 1 and 4 inclusive; and C. a divalent bisphenyl fluorenyl or spiro indanyl radical; and Y is individually in each occurrence a hydrogen radical, a monovalent $C_{1-4}$ hydrocarbyl radical, or a halogen, and p is a positive integer between 1 and 3 inclusive; and n is a positive real number of about 5 or greater.

2. The polymer of claim 1 wherein Ar comprises an inertly substituted phenylene or naphthylene, wherein the inert substituents are selected from the group consisting of a monovalent $C_{1-8}$ hydrocarbyl radical, a monovalent $C_{1-8}$ hydrocarbyloxy radical, and a halogen.

3. The polymer of claim 2 wherein the inert substituents are selected from the group consisting of a monovalent $C_{1-4}$ hydrocarbyl radical, a monovalent $C_{1-4}$ hydrocarbyloxy radical, and a halogen.

4. The polymer of claim 3 wherein the inert substituents comprise a halogen selected from the group consisting of fluorine, chlorine, and bromine.

5. The polymer of claim 1 wherein Ar comprises

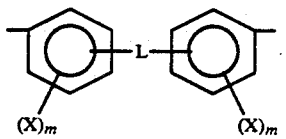

wherein

L is a direct bond, or L is a divalent $C_{1-8}$ hydrocarbyl radical, a divalent $C_{1-4}$ halohydrocarbyl radical, —O—, —CO—, —S—, —SO—, —SO$_2$—, or —SS—.

6. The polymer of claim 5 wherein L is a direct bond, or L is a divalent $C_{1-4}$ hydrocarbyl radical, a divalent $C_{1-4}$ halohydrocarbyl radical, —O—, —CO—, —S—, —SO—, —SO$_2$—, or —SS—.

7. The polymer of claim 6 wherein L is a direct bond, or L is a divalent $C_{1-3}$ hydrocarbyl radical, or a divalent $C_{1-3}$ fluorohydrocarbyl radical.

8. The polymer of claim 7 wherein L is a direct bond, or L is an unsubstituted or fluoro-substituted methylene radical, or an unsubstituted or fluoro-substituted isopropylidene radical.

9. The polymer of claim 1 wherein Ar comprises

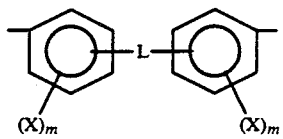

wherein

X is selected from the group consisting of a hydrogen radical, a monovalent $C_{1-3}$ hydrocarbyl radical, a monovalent $C_{1-3}$ halohydrocarbyl radical, and a halogen.

10. The polymer of claim 9 wherein X is selected from the group consisting of a fluorohydrocarbyl radical and fluorine.

11. The polymer of claim 1 wherein the polymer possesses a glass transition temperature of at least about 100° C.

12. The polymer of claim 11 wherein the polymer possesses a number-average molecular weight of between about 4,000 and about 100,000.

13. The polymer of claim 12 wherein the polymer possesses a tensile modulus of at least about 200,000 psi as measured by ASTM D-1708.

14. The polymer of claim 12 wherein the polymer possesses a tensile strength of at least about 4,000 psi as measured by ASTM D-1708.

15. The polymer of claim 12 wherein the polymer possesses an elongation at break of at least about 2 percent as measured by ASTM D-1708.

16. The polymer of claim 12 wherein the polymer exhibits a weight loss of less than about 10 percent at about 400° C. as measured by thermogravimetric analysis.

* * * * *